3,520,844
POLYESTER RESIN MODIFIED SOLUTION VINYL
RESIN COATING COMPOSITIONS
Jerry D. Pontius, Munster, and Meredith F. Taylor,
Hammond, Ind., and Caesar W. Tieri, Jr., Chicago
Heights, Ill., assignors to The Sherwin-Williams
Company, Cleveland, Ohio, a corporation of Ohio
No Drawing. Filed Oct. 12, 1967, Ser. No. 674,717
Int. Cl. C08f *45/34;* C08g *45/04*
U.S. Cl. 260—32.8                                    15 Claims

ABSTRACT OF THE DISCLOSURE

Coating compositions having improved hot hardness are prepared from combinations of solution vinyl resins and oil-free polymeric polycarboxylic polyhydric alcohol polyester resins and a nitrogen containing cross linking agent therewith.

---

The term "solution vinyl resin" is used in the art to describe a class of resins which are addition copolymers of vinyl compounds, e.g., vinyle chloride and vinyl acetate, with or without small amounts of maleic anhydride. This invention, while not exclusive to, does require that one of the solution vinyl resins be a copolymer containing maleic anhydride as described. These copolymers form solutions in organic solvents such as ketones and have been widely used in coating compositions for metals which are subjected to baking after application of the coating. One of the disadvantages of such coatings has been a lack of hot hardness. For example, in coating household refrigerator parts, one of the newer applications is the coating of refrigerator liners. In spite of its higher cost, the solution vinyl resin has been widely used in this type of coating because of flexibility and stain resistance. Unfortunately, when insulation is applied, for instance, foamed polyurethane, heat is generated and this softens the vinyl resin, sometimes causing it to mar on jigs or molds used to hold the components of the housing in place during this operation.

A primary object of this invention is to correct the aforementioned deficiency of coating compositions made from solution vinyl resins.

An additional object is to produce new and improved solution coating compositions which provide coatings having not only better hot hardness but also higher solids, lower unit cost, improved solvent resistance and better weathering resistance.

A further object is to provide a new and improved process for making such compositions. Other objects will appear hereinafter.

In accordance with the invention, coating compositions having a high degree of hot hardness are prepared which comprise one or more solution vinyl resins and one or more oil-free polymeric polycarboxylic polyhydric alcohol polyester resins, together with a nitrogen containing cross linking resin and suitable solvents, with or without pigments and other auxiliary agents, such as, heat stabilizers, plasticizers, catalysts, and mar proofing agents.

The solution vinyl resins which are necessary for the purpose of the invention consist essentially of vinyl chloride coplymerized with vinyl acetate and interpolymerized with maleic anhydride. Especially useful resins are those sold under the trade names VMCH and VMCC. These resins contain 65±5% of vinyl chloride and 13±5% of vinyl acetate, together with 0.25% to 4% maleic anhydride. The VMCC resin is similar to the VMCH resin except that it has a lower molecular weight.

The vinyl resin solids are soluble in ketone solvents, for example, isophorone, methyl isobutyl ketone, acetone, methyl ethyl ketone, and isoamyl ketone. Blends of ketones can also be employed with aromatic solvents, e.g., xylene, toluene and 100 flash or 150 flash aromatic naphtha.

For most purposes the composition of the invention are prepared with a hiding pigment. Examples of suitable pigments are titanium dioxide, phthalocyanine blue, phthalocyanine green, chrome yellow, chrome orange, ferrite yellow, red iron oxide, carbon black, lampblack, chrome oxide green, quinacridone red and quinacridone violet. The proportion of hiding pigment in the composition will vary depending upon the type of pigment and ordinarily may be as low as 3% by weight for a black pigment and up to 40% by weight of a white pigment. Inert and extender pigments, e.g., silica aerogels, talcs, and diatomaceous silica, commonly used in organic coatings are suitable for controlling the gloss of the compositions.

The oil-free polyester resins employed to modify the solution vinyl resins are prepared by polymerizing organic polycarboxylic acids or anhydrides or lower alkyl esters of polycarboxylic acids with polyhydric alcohols. Mixtures of such acids and/or mixtures of such alcohols can be employed.

The method of preparing the polyesters is subject to variation and does not constitute a part of this invention.

As examples of polycarboxiyle acids which can be employed in preparing the polymeric polyesters, the following may be mentioned: o-phthalic or its anhydride, isophthalic, adipic, malonic, azelaic, tetrahydrophthalic and its anhydride, hexahydrophthalic and its anhydride, endomethylene tetrahydrophthalic and its anhydride, hexachloroendomethylene tetrahydrophthalic and its anhydride, sebacic acid, dimerized vegetable fatty acids, hydrogenated dimerized vegetable fatty acids and diglycolic or thiodiglycolic acid. Obviously, the methyl esters of the dibasic acids listed could be utilized in the practice of this invention by means of reacting by transesterification versus the normal estirification route. The preferred polycarboxylic acids are isophthalic, terephthalic, orthphthalic, phthalic anhydride and azelaic. The best results have been obtained by using isophthalic acid blended with adipic acid or azelaic acid.

The following diols are appropriate for the preparation of the polyester resins employed in the practice of the present invention: butylene glycol 1,4-bis-2-hydroxyethyl thioether; butylene glycol 1,3; 1,4-cyclohexanedimethanol; dibromoneopentyl glycol; diethylene glycol; dipropylene glycol; bis-2-hydroxyethoxy Bis-phenol A; 2,2-dimethyl-3-hydroxy propyl 2,2-dimethyl 1,3-hydroxy propionate; ethylene glycol, 1,6-hexanediol; hydrogenated Bisphenol A; methyl diethanolamine; neopentyl glycol; 1,5-pentanediol; propylene glycol; 2,2,4-trimethyl-3-pentanediol and ethoxylated or propoxylated diols or diamines. Certain monooxiranes may be utilized, such as, glycidyl esters of monobasic carboxylic acids or glycidyl ethers of monohydric alcohols or alkyl monooxides, such as propylene oxide, butylene oxide or oxides of the alpha olefins. The preferred diols in the practice of this invention are neopentyl glycol and blends of neopentyl glycol with ethylene glycol, propylene glycol or 2,2,4-trimethyl-1,4- pentanediol.

The following polyols containing at least three hydroxyl groups are examples of such compounds which can be employed in making polyesters suitable for use in the practice of this invention; dipentaerythritol; glycerine; 1,2,6-hexanetriol; pentaerythritol; sorbitol; hydrogenated sugars; trimethylol ethane; trimethylol propane and various ethoxylated and propoxylated triols and tetrols. Trimethylolethane and blends of trimethylolethane with other triols and tetrols are preferred. Trimethylolpropionic acid can also be used.

As an example of a commercially available polyester which can be used in the practice of the invention there may be mentioned an oil-free dimer acid polyester sold under the name Cyplex 1526.

For the best results, it is desirable to use a polyester resin of the type described having a low acid value, preferably within the range of 3 to 25. The use of a polyester resin of this type gives compositions having low viscosities.

The coating compositions produced in accordance with the invention can also contain plasticizers, such as, for example, dibutylphthalate, diisodecylphthalate (DIDP), dioctylphthalate, butylbenzylphthalate, Parplex G–25 linear polyester, or Paraplex G–62 epoxidized oil.

The compositions of the invention can also contain commercially available heat stabilizers, well known in the art, either alone or in combination with synergistic epoxy resins or chelating agents.

In addition, the compositions of the invention are prepared with nitrogen-containing cross linking agents, preferably of the urea-formaldehyde or melamine types, for example, hexamethoxymethyl melamine and fusible urea-formaldehyde and melamine-formaldehyde resins. Trade names for some of these cross linking agents are Cymel 300, 301, and 350; Resimine RF–5306 and Resimine RF–5307; and Plaskon 3381 (isobutylated melamine).

The foregoing components of the coating compositions can be present in varying proportions, a general range of proportions being as follows:

| Components: | Percent by weight |
| --- | --- |
| Solution vinyl resin solids | 1.5–40 |
| Organic liquid carrier | 10–50 |
| Polyester resin solids | 5–45 |
| Pigment | 0–40 |
| Heat stabilizer | 0–4 |
| Nitrogen-containing cross linking agent | .25–9 |
| Marproofing agents | 0–1 |
| Plasticizer | 0–15 |
| Acid catalyst | 0–1 |

The proportions are controlled to give a total of 100% and a viscosity normally within the range of 100 centipoises to 1,500 centipoises on a Brookfield viscometer at 25° C. The viscosity depends upon the method of application to be employed, for example, spraying, dipping or roller coating.

Acid catalysts are used to activate and accelerate the cross linking reaction between the nitrogen-containing cross linking agent and the other resin solids. Examples of such catalysts are Aerosol OT, para-toluene sulfonic acid and phosphoric acid.

Examples of marproofing agents which can be added to the composition are polyethylene gel (25% polyethylene by weight in isophorone), petrolatum and polymekon wax.

The invention will be further illustrated but is not limited by the following examples in which the quantities are given in parts by weight unless otherwise indicated.

EXAMPLE I

This example illustrates the preparation of a high gloss coating composition which has a relatively high solution vinyl resin content and a relatively low oil-free polyester resin content.

(A) A polyester resin was prepared by reacting 7.2 parts of trimethylol propane, 36.5 parts neopentyl glycol, 20.8 parts adipic acid and 35.5 isophthalic acid. This resin was dissolved in a solvent mixture of 80% xylene and 20% monobutylether of ethylene glycol in proportions to form a solution composed of 60% solids and 40% solvent.

(B) A pigment dispersion was prepared by grinding on a high speed disperser 77 parts isophorone, 29 parts vinyl resin VYHH (copolymer of 87% by weight vinyl chloride and 13% by weight vinyl acetate), 2 parts blown castor oil dispersing agent and 200 parts titanium dioxide pigment (R–900).

(C) A vinyl resin solution was prepared by mixing 168 parts isophorone, 210 parts 100 flash aromatic naphtha, 103 parts vinyl resin VMCH (copolymer of 86% by weight vinyl chloride and 13% by weight vinyl acetate interpolymerized with 1% by weight maleic anhydride) and 34 parts vinyl resin VMCC (similar to VMCH but with lower molecular weight).

(D) The compositions from (B) and (C) were mixed together with 158 parts of the polyester solution from (A) and to the resultant composition was also added 25 parts hexamethoxymelamine (Cymel 301), 6 parts wax solution, 10 parts epoxy resin heat stabilizer, 12 parts acrylic copolymer flow additive (Modaflow), and 0.5 part Aerosol OT. The mixing was carried out at a temperature within the range of room temperature to 130° F.

The composition prepared as above described was found to be excellent for coating the liners of household and commercial refrigerators. It is also excellent for use in forming pigmented or unpigmented coatings for application to aluminum, steel, and galvanized substrates which find utility for trailer and mobilehome sheeting, appliance sheeting, awnings and related accessories, construction sheeting and other purposes. It can be applied in any conventional manner and the resultant coating is baked so that a peak minimum metal surface temperature of 375° F. is reached momentarily. The oven temperature can vary within a relatively wide range, for example, 350° F. to 800° F. but generally good results are obtained when the temperature of the substrate during baking reaches 350° F. to 375° F. momentarily.

EXAMPLE II

This example illustrates the preparation of a high polyester resin-low solution vinyl resin-high gloss coating composition.

(A) The vinyl resin solution was prepared by mixing 55 parts aromatic naphtha (100 flash), 7.5 parts vinyl resin VMCH, 22.5 parts vinyl resin VMCC and 43 parts isophorone with agitation.

(B) 300 parts titanium dioxide pigment (CL–NC) were mixed with 133 parts polyester resin solution from Example I(A) and ground to a Hegman fineness of 7H. Thereafter, 210 parts of polyester resin solution from Example I(A) and 62 parts of solid nitrogen resin (Cymel 301) were added together with modifiers in the same relative proportions as in Example I(D).

The compositions from (A) and (B) were mixed together at 75° F. to 130° F. to give the final product which is especially useful for coating aluminum or steel sheeting (e.g., refrigerator lining, trailer skins and awnings). The coating can be applied by roll coating or spray coating and the resultant coated article baked in an oven at an oven temperature of 420° F. for 90 seconds or 500° F. for 60 seconds.

EXAMPLE III

To produce low gloss coatings, silica aerogel can be added to the coating compositions of Examples I and II. A significant lowering of gloss can be obtained by adding 2 parts silica aerogel but a range of 2 to 100 parts can be used and about 40 parts is preferred.

EXAMPLE IV

The procedure was the same as in Example I except that the polyester resin of (A) was prepared by reacting 31.4 parts 2,2,4-trimethyl-3-pentane diol (TMPD), 10.2 parts trimethylolethane, 7.8 diethylene glycol, 6.0 parts adipic acid and 44.6 parts of a 4:1 by weight mixture of isophthalic acid and terephthalic acid plus 0.2 part of catalyst (dibutyltindilaurate).

EXAMPLE V

The procedure was the same as in Example I except that the polyester resin of (A) was prepared by substituting propylene glycol for ¼ of the neopentyl glycol on a molar basis. This gave a polyester resin having an acid value of 11.3.

EXAMPLE VI

The procedure was the same as in Example I except that the polyester resin of (A) was prepared by substituting propylene glycol for ½ of the neopentyl glycol on a molar basis. The resultant polyester resin had an acid value of 9.9.

EXAMPLE VII

The procedure was the same as in Example I except that the polyester resin of (A) was prepared by substituting propylene glycol for ¾ of the neopentyl glycol on a molar basis. The resultant polyester resin had an acid value of 8.1.

EXAMPLE VIII

The procedure was the same as in Example I except that the polyester resin of (A) was prepared by substituting ethylene glycol for ¼ of the neopentyl glycol on a molar basis. The resultant polyester resin had an acid value of 8.

EXAMPLE IX

The procedure was the same as in Example I execpt that the polyester resin of (A) was prepared by substituting ethylene glycol for ½ of the neopentyl glycol on a molar basis. The resultant polyester resin had an acid value of 7.8.

EXAMPLE X

The procedure was the same as in Example I except that the polyester resin of (A) was prepared by substituting ethylene glycol for ¾ of the neopentyl glycol on a molar basis. The resultant polyester resin had an acid value of 7.6.

EXAMPLE XI

The procedure was the same as in Example I except that the polyester resin of (A) was prepared by substituting TMPD plus 6% excess TMPD for ¼ of the neopentyl glycol on a molar bassis. The resultant polyester resin had an acid value of 4.

EXAMPLE XII

The procedure was the same as in Example I except that the polyester resin of (A) was prepared by substituting TMPD plus 6% excess TMPD for ½ of the neopentyl glycol on a molar basis. The resultant polyester resin had an avid value of 4.8.

EXAMPLE XIII

The procedure was the same as in Example I except that the polyester resin of (A) was prepared by substituting TMPD plus 6% excess TMPD for ¾ of the neopentyl glycol on a molar basis. The resultant polyester resin had an acid value of 9.5.

EXAMPLE XIV

The procedure was the same as in Example I except that the polyester resin of (A) was prepared by substituting trimethylol ethane in the same proportions for trimethylolpropane on a molar basis. The resultant polyester resin had an acid value of 7.9.

The term "high gloss coating" as used herein refers to a gloss of at least 80 as measured on a 60° photovoltmeter.

The invention has a number of advantages. In the first place, the addition of the polymeric polycarboxylic-polyhydric alcohol resin to the solution vinyl resin is made in a sufficient amount to improve the hot hardness of a dried coating of the resultant composition. In other words, the coating softens at a higher temperature than a coating of the solution vinyl resin. Furthermore, by increasing the amount of the ployester resin, it is possible to improve the glass of the resultant coating and to make higher gloss coatings. In addition, the polyester modified solution vinyl resin has excellent adhesion to metal surfaces without a primer.

A further improvement in the practice of the invention is obtained by adding a cross linking agent, such as a nitogen-containing compound like hexamethoxymethyl melamine or a fusible melamine-formaldehyde or urea-formaldehyde resin. Solution vinyl resins are normally completely thermoplastic and therefore have poor solvent resistance. By cross linking the polyester resin and a nitrogen-containing compound of the type described, the solvent resistance is significantly improved and the hardness is at a level higher than that normally associated with the solution vinyl resin.

Another advantage of the invention is that plasticizers can be reduced in amount and in some cases eliminated while retaining a completely acceptable degree of flexibility. The resultant products have a distinct advantage in durability, volume solids remain at the high level and the costs advantages are not lost. Because of the nature of the polyester resins used to modify the solution vinyl resins there is a gain in heat stability rather than a loss. The organic liquid carriers or solvents which can be employed in making these compositions are such that excellent package stability is maintained.

The compositions of the invention are especially useful when baked on aluminum, steel or galvanized steel, with or without a ground coat, for siding, building sheet, awnings, roof shingles, interior curtain walls and appliances. They can also be used on other substrates, e.g., particle board, Crezon overlaid fibre board, and paper products.

The invention is hereby claimed as follows:

1. A coating composition consisting essentially of the following components:

| Components: | Percent by weight |
|---|---|
| Solution vinyl resin solids consisting essentially of a copolymer of vinyl chloride and vinyl acetate interpolymerized with maleic anhydride | 1.5–40 |
| Organic liquid carrier | 10–50 |
| Saturated oil free polymeric polycarboxylic polyhydric alcohol polyester resin solids | 5–45 |
| Pigment | 0–40 |
| Heat stabilizer | 0–4 |
| Nitrogen-containing cross linking agent | .25–9 |
| Marproofing agents | 0–1 |
| Plasticizer | 0–15 |
| Acid catalyst | 0–1 |

2. A coating composition as claimed in claim 1 in which said polyester resin has an acid value within the range of 3 to 25.

3. A coating composition as claimed in claim 1 in which said oil-free polyester resin is made by reacting an acid from the group consisting of isophthalic, terephthalic, orthophthalic, phthalic anhyride, adipic and azelaic with a polyhydric alcohol from the group consisting of trimethylolethane, trimethylolpropane, neopentyl glycol, ethylene glycol, propylene glycol, diethylene glycol and 2,2,4-trimethyl-3-pentane diol.

4. A coating composition as claimed in claim 1 in which said oil-free polyester resin has an acid value within the range of 3 to 25 and is made by reacting trimethylolpropane, neopentyl glycol, adipic acid and isophthalic acid.

5. A coating composition as claimed in claim 1 in which said oil-free polyester resin has an acid value within the range of 3 to 25, and is made by reacting trimethylolpropane, neopentyl glycol, propylene glycol, adipic acid and isophthalic acid.

6. A coating composition as claimed in claim 1 in which said oil-free polyester resin has an acid value within the range of 3 to 25 and is made by reacting trimethylolpropane, neopentyl glycol, ethylene glycol, adipic acid and isophthalic acid.

7. A coating composition as claimed in claim 1 in which said oil-free polyester resin has an acid value within the range of 3 to 25 and is made by reacting trimethylolpropane, neopentyl glycol, 2,2,4-trimethyl-3-pentane diol, adipic acid and isophthalic acid.

8. A coating composition as claimed in claim 1 in which said oil-free polyester resin has an acid value within the range of 3 to 25 and is made by reacting trimethylolethane, neopentyl glycol, adipic acid and isophthalic acid.

9. A coating composition as claimed in claim 1 in which said oil-free polyester resin has an acid value within the range of 3 to 25 and is made by reacting 2,2,4-trimethyl-3-pentane diol, trimethylolethane, diethylene glycol, adipic acid, isophthalic acid and terephthalic acid.

10. A coating composition as claimed in claim 1 in which said nitrogen-containing cross linking agent is from the class consisting of hexamethoxymethyl melamine and fusiable urea-formaldehyde and melamine-formaldehyde resins.

11. A coating composition as claimed in claim 1 in which said nitrogen-containing cross linking agent is hexamethoxymethyl melamine.

12. A process which comprises applying a coating composition as claimed in claim 1 directly to a substrate and baking said coating.

13. A process as claimed in claim 12 in which the substrate is aluminum.

14. A process as claimed in claim 12 in which the subtrate is steel.

15. A process as claimed in claim 12 in which said coating composition is applied without a ground coat.

References Cited

UNITED STATES PATENTS

| | | | |
|---|---|---|---|
| 2,647,099 | 7/1953 | Smith | 260—873 X |
| 3,281,498 | 10/1966 | Watkins et al. | 260—873 |

OTHER REFERENCES

Bjorksten: Polyesters and Their Applications, Reinhold Publishing Corp., 1956, page 316, Sci. Lib., TP 986 P6B5.

Chemical Abstracts, "Hexamethoxymethylmelamine (HMMM) With Alkyd and Epoxy Resins for Surface Coatings," 1963, vol. 60, Col. 16100b.

Penn: PVC Technology, Maclaren & Sons, Ltd., 1962, pages 13 and 21, Sci. Lib., TP 986 V48P4.

MORRIS LIEBMAN, Primary Examiner

L. T. JACOBS, Assistant Examiner

U.S. Cl. X.R.

117—132; 260—40, 873